United States Patent [19]

Wallace

[11] 4,028,458
[45] June 7, 1977

[54] METHOD FOR MAKING HOT MELT ADHESIVE STICKS AND OTHER SHAPES

[75] Inventor: Ray H. Wallace, Rockland, Mass.

[73] Assignee: Transworld Adhesive & Chemical Corporation, Rockland, Mass.

[22] Filed: Aug. 25, 1975

[21] Appl. No.: 607,097

[52] U.S. Cl. .............................. 264/148; 264/328; 264/329

[51] Int. Cl.² ........................................ B29F 1/04

[58] Field of Search .................. 264/328, 329, 148

[56] References Cited

UNITED STATES PATENTS

| | | | |
|---|---|---|---|
| 2,469,342 | 5/1949 | Richardson | 264/148 |
| 2,488,344 | 11/1949 | Stonestreet | 264/148 |
| 3,322,708 | 5/1967 | Wilson | 260/28.5 AV |
| 3,392,224 | 7/1968 | Archer | 264/176 R |
| 3,484,513 | 12/1969 | Paoli | 264/148 |
| 3,665,068 | 5/1972 | Duling | 264/329 X |

*Primary Examiner*—Richard R. Kucia
*Attorney, Agent, or Firm*—Robert A. Cesari; John F. McKenna; Andrew F. Kehoe

[57] ABSTRACT

In a method for making hot melt adhesive sticks and other shapes for subsequent use in hot melted adhesive applicators, a charge of a hot melt adhesive is injected into one end of a cooling chamber, the opposite end of the chamber being sealed by a solid plug from a previous adhesive charge. This first charge is maintained under pressure until its outside wall forms and sets so that any shrinkage occurs at the end of the charge. That shortage is made up when the next charge of hot melt adhesive is injected into the chamber. If the first charge has not set sufficiently to be self-supporting, the pressure of the next charge balloons the soft side walls of the insufficiently set charge outward against the chamber walls so that that charge does not move along the chamber, but remains for another complete cycle of operation until it is ready. Thus each adhesive stick ejecting from the opposite end of the chamber is uniform, accurately dimensional and solid. Then the protruding end of the solid stick is severed leaving a solid plug which seals the exit end of the chamber when the next charge of liquid adhesive is injected into the chamber.

5 Claims, 5 Drawing Figures

METHOD FOR MAKING HOT MELT ADHESIVE STICKS AND OTHER SHAPES

BACKGROUND OF THE INVENTION

This invention relates to a method for making thermoplastic sticks or other shapes. The technique is particularly suitable for the manufacture of hot melt adhesive sticks, and, accordingly, it will be described in that context. It should be understood, however, that it can easily be employed to make other thermoplastic shapes.

The main advantage of hot melt adhesive is that it can be applied in liquid form, yet sets in seconds so that there is no appreciable slowdown in the production of the articles involved. Hot melt adhesive in stick form is preferred because the stick can be loaded conveniently into a gun-like applicator which melts the adhesive and dispenses it as a liquid bead onto the surfaces to be adhered. An applicator of this type is shown, for example, in copending application Ser. No. 509,335, filed Sept. 26, 1974, entitled ADHESIVE APPLICATOR TOOL, owned by the assignee of the present application. These adhesives and applicators are widely used, for example, in the shoe and packaging industries.

It has been found, however, that sometimes the sticks do not feed through the applicator properly unless they are of uniform consistency and diameter, e.g. ±0.010 inch. Improper feed causes the applicator to dispense a nonuniform bead resulting in adhesive skips or wastage. In some cases, the adhesive fouls the applicator so badly that the applicator breaks down. Thus, not only are maintenance costs increased, but an entire production line may have to be stopped until the problem is remedied or until a spare applicator can be brought on line.

It is difficult to make hot melt adhesive sticks of uniform size and shape because of the characteristics of the adhesives themselves. In liquid form, they are sticky. However, in air, the adhesive sets in a few seconds to a solid having a durometer on the order of 50 Shore, and while setting in a mold, an adhesive stick may shrink by as much as 15 or 20 percent. Furthermore, the stick tends to set from the outside in, with the result that shrinkage also occurs along the axis of the stick. This, in turn, causes relatively large elongated wells or cavities to form in the ends of the stick, the sizes of these cavities increasing with increasing stick diameter. In addition, if the stick is released prematurely from a mold, it may settle under its own weight or bend. For these reasons, there are a large number of deflective sticks. Further, since the material can only be recycled one or two times before it loses its correct adhesive characteristics, there is considerable wastage.

A conventional procedure for making shaped articles of thermoplastic material is shown, for example, in U.S. Pat. No. 3,723,035. Aside from encountering problems with the inherent stickiness of the material above its melting temperature and frequent tackiness below that temperature, prior techniques have not solved the shrinkage and cavitation problems discussed above and generally have not resulted in the efficient manufacture of uniform, solidified, hot melt adhesive sticks and shapes.

It has also been proposed to make adhesive sticks with continuous extruders of the type conventionally used to extrude thermoplastics. While the continuous extrusion process works fairly well with the higher melting point adhesives, difficulties are still encountered unless very precise cooling control is used. Moreover, such extruders are very expensive compared to batch-type equipment. Thus, instead of relying on more complex and expensive equipment, manufacturers have tended to minimize the effects of shrinkage and cavitation on the overall shape of the adhesive sticks by limiting the diameter of the stick. For example, one hot melt adhesive stick now in use is only one-half inch in diameter and about 4 to 5 inches long. This means that the person using an applicator accepting such sticks must stop quite often to reload. Not only is this troublesome to the operator, but it also slows down production.

SUMMARY OF THE INVENTION

Accordingly, the present invention aims to provide a method of making thermoplastic sticks and shapes of uniform size and consistency.

Another object of the invention is to provide a method of making hot melt adhesive sticks and shapes which are substantially free of cavities and voids.

A further object is to provide a method of making a hot melt adhesive stick having an unusually large, uniform cross section along its entire length.

Other objects will in part be obvious and will in part appear hereinafter.

The invention accordingly comprises the several steps and the relation of one or more of such steps with respect to each of the others, and the apparatus embodying the features of construction, combination of elements, and arrangement of parts which are adapted to effect such steps, all as exemplified in the following detailed description, and the scope of the invention will be indicated in the claims.

Briefly, the present technique involves an operation in which a charge of hot melt adhesive or other thermoplastic material in liquid form is injected into one end of a cooling chamber of uniform cross section. As the chamber fills with liquid, the pressure thereof ejects a solidified stick from the opposite end of the chamber resulting from a previous charge or charges. The outward movement of that stick is stopped before it is fully ejected from the chamber. After a suitable delay for conditioning purposes, the protruding part of the stick is severed leaving a solid, adhesive plug in the exit end of the chamber to seal that end when the next charge of liquid adhesive is injected into the chamber. Thus, no special gates or seals are required at the exit end of the chamber.

As each charge of adhesive sets in the cooling chamber, it undergoes the usual shrinkage. However, the injecting charge is maintained under pressure until its outside wall forms and sets so that the shrinkage is confined to the end of the charge. Then the succeeding charge of liquid adhesive makes up any shortage in the trailing end of the previous charge which constitutes the plug in the exit end of the chamber and the two charges meld together forming a barely perceptible joint or boundary. Thus each charge is insensitive to the shrinkage characteristics of the adhesive with the result that the charge has a uniform cross section along its entire length as does each ejected adhesive stick. Also, since each finished adhesive stick is severed from a longer adhesive charge, it has good squared-off ends.

If the preceeding adhesive charge has not set sufficiently to maintain its shape, i.e. its center is still too soft, the pressure of the incoming charge of liquid adhesive pushes into the trailing end of the previous charge and causes its soft inside walls to balloon outward against the chamber walls, acting like a brake. Resultantly, that insufficiently set charge does not move along the chamber to provide room for the new adhesive charge. In other words, if the charge is not ready, it will remain in the chamber for an extra complete cycle of operation, after which it presumably would be self-supporting and the chamber skips a cycle. Accordingly, each stick formed by this process is straight and true.

After each ejected stick is severed at the exit end of the cooling chamber, a new charge of liquid resin is injected into the chamber and the process is repeated.

In a preferred apparatus for practicing the process, several such chambers are mounted parallel to one another in a circular array and are within a cooling jacket through which refrigerant is circulated. Liquid adhesive is pumped from a source to the entrance ends of the chambers by way of a rotary plate which functions as a set of multiple gate valves. The plate has openings which are brought into alignment with the chamber ends as the plate is rotated, at which time liquid adhesive is injected into those chambers.

A knife positioned just beyond the exit ends of the chambers rotates in synchronism with the valve plate. Its cutting edge is arranged to sweep past the exit ends of the chambers in succession so that the solidified adhesive sticks partially ejected from the chambers are sheared off at the ends of the chambers. Positioned beyond the knife is a stop member which rotates with the knife and valve plate. This stop member limits the extent to which ejecting sticks can project from the chambers. The angular relationships between the openings in the valve plate, the knife blade, and the stop member are arranged to achieve the sequence of process steps described above with respect to each chamber in the array. Thus, the apparatus is designed to operate on a continuous basis to make batches of adhesive sticks of uniform size and shape. Furthermore, the system has a relatively high production rate and can operate unattended for a long period before its adhesive reservoir has to be refilled. Resultantly, the costs involved in making and using adhesive sticks of this general type are markedly reduced.

BRIEF DESCRIPTION OF THE DRAWINGS

For a fuller understanding of the nature and objects of the invention, reference should be had to the following detailed description taken in connection with the accompanying drawings, in which:

Turning now to FIG. 1 of the drawings, in accordance with the first step in this process, a gate valve 4 opens to admit a charge 6 of liquid thermoplastic such as a hot melt adhesive into the entrance end of a cooling chamber 10 having a uniform cross section along its length. The pressure of the incoming liquid forces a previous adhesive charge 6a, which has already set, from the opposite end of the chamber. A stop plate 12 is positioned in the path of the ejecting charge 6a stopping its movement and thus stopping the flow of additional liquid into the chamber. Plate 12 is positioned beyond the exit end of chamber 10 a distance less than the length of the chamber. In the illustrated embodiment, that distance is one-half the length of the chamber so that an almost solid adhesive charge 6b remains in the chamber. When setting, the adhesive shrinks. However, in accordance with this method the incoming liquid adhesive charge is maintained under pressure until its outside wall forms and sets. As a result of this pressure, the charge has a uniform cross section along its entire length and all shrinkage appears at its trailing end, mostly in the form of cavitation. Such a cavity is indicated at C in the trailing end of the almost solid charge 6b in chamber 10. In the present method, the incoming liquid charge 6 makes up the shortage in charge 6b due to shrinkage and fills cavity C and any other irregularities in the end of charge 6b and meld and merges with the end of that charge forming a barely perceptible bonding B as shown in the step 2 figure.

Figure 1:
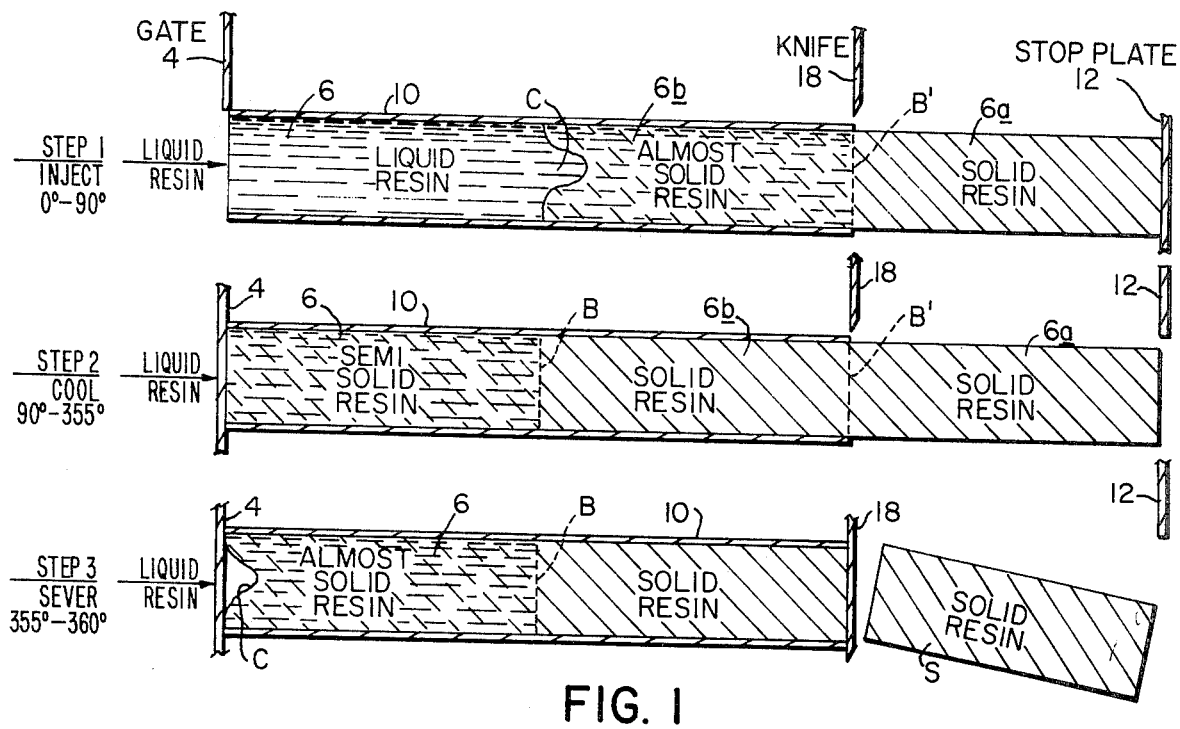
FIG. 1 is a diagrammatic view illustrating the successive steps involved in the process of making thermoplastic shapes according to this invention.

After the plate 12 has stopped the outward movement of charge 6a, and thereby the injection of additional liquid into chamber 10, gate valve 4 closes the entrance end of the chamber and the stop plate 12 retracts at the beginning of step 2 of the process. During this second step, the new adhesive charge 6 in chamber 10 is cooled and begins to set, becoming semi-solid. It becomes essentially a continuation of the now solidified charge 6b still plugging the exit end of the chamber so that there is essentially no discernible joint at the boundary B between those two adhesive charges 6 and 6b. At the same time, the portion of the charge 6a protruding from the chamber becomes conditioned to the atmosphere and becomes warmer so that it does not crack when separated during the next step in the process.

In the third and final step of the process, a knife 18 at the exit end of chamber 10 severs the charge 6a from the leading end of the charge 6b still in the chamber. It should be noted that charge 6a has remained projecting from chamber 10 all during step 2 of the process so that it is fully conditioned to the atmosphere and has warmed considerably from its temperature in chamber 10, e.g. −10° F. Accordingly, knife 18 slices through the charge easily. Without such conditioning, the charge might crack upon being struck by the knife. That severed portion comprises a solid adhesive stick S which is fully conditioned and of definite length and diameter. Note also that knife 18 cuts right at the boundary B' between charges 6a and 6b so that any irregularity at that location is not present in the finished stick S.

The now solid charge 6b still in the chamber constitutes a solid plug which seals the exit end of the chamber when the next charge of liquid is injected into the chamber. Thus, no special seals or gates are required at that location to prevent leakage during the next process cycle. By this time, the charge 6 in chamber 10 has usually set sufficiently to be self-supporting and, like its predecessor charge, has undergone shrinkage so that cavitation C is also present at its trailing end after step 3.

In the event that a charge, say charge 6, has not set sufficiently, it will not move along the chamber during the next injection step 1 and no stick ejects from the chamber. In other words, the system automatically skips a cycle or more until charge 6 has set properly.

More particularly, if the charge 6 in FIG. 1 step 3 is still too soft when the gate valve 4 opens to admit a new liquid adhesive charge, the pressurized liquid pulses against the wall of cavity C and the soft side walls of charge 6 are ballooned outward against the chamber 10 walls thereby acting as a brake and preventing any movement of the charge 6. Thus, the process operates in a fail-safe mode so that no adhesive sticks S are formed that would subsequently deform under their own weight or the influence of outside forces normally encountered during handling, etc.

Assuming the charge 6 has sufficiently, it is pushed along the chamber thereby ejecting the solid charge 6b when gate valve 4 reopens and a new charge of liquid adhesive enters the chamber in accordance with step 1, and so on.

In a typical case, chamber 10 is a steel cylinder on the order of 18 inches long with an internal diameter of 7/8 inches. Preferably, its inside walls are coated with a film lubricant such as polytetrafluoroethylene to facilitate ejection of the adhesive charges from the chamber. Typically, liquid adhesive is injected into chamber 10 under a pressure on the order of 300–400 psi, which pressure is sufficient to push a solidified adhesive charge from the chamber provided that charge has cooled sufficiently to release from the chamber walls, that release temperature also being one at which the adhesive is self-supporting. A hot melt adhesive having the proper shrinkage versus temperature characteristic has a melting point of 188° F and the following makeup:

|  | Parts by Weight |
| --- | --- |
| EVA-350[a] (ethylene copolymer) | 40 |
| CKM-2400[a] (phenolic resin tackifier) | 15 |
| Piccolyte A-115[b] (polyterpene tackifier) | 12.5 |
| Super STa Tac[c] (synthetic polyterpene) | 12.5 |
| Polywax 1000[d] (wax for lowering viscosity) | 10 |
| Castorwax[a] (wax for lowering viscosity) | 10 |
| Antioxidant 330[f] | 0.1 |

[a]Union Carbide Corp.
[b]Pennsylvania Industrial Chemical Corp.
[c]Reichhold Chemicals, Inc.
[d]Bareco Div. of Petrolite Corp.
[e]Baker Caster Oil Co.
[f]Ethyl Corp.

Stop plate 12 may be spaced from the exit end of chamber 10 on the order of 6 inches so that each 7/8 inch diameter stick S is 6 inches long. Of course, the dimensions of the stick may be varied to suit particular needs. The only constraint on the shape of the stick is that it should have a uniform cross section along its length so that it can be ejected from chamber 10. Thus, for example, the stick can have a star-shaped, oval or square cross section.

Turning now to FIGS. 2 to 5 of the drawings, for increased efficiency, it is desirable to carry out the above batch process steps simultaneously on a succession of chambers 10. This is conveniently done if the chambers are arranged parallel to one another in a circular array. In these figures, each chamber 10, gate valve 4, stop plate 12 and knife 18 will carry the same identifying numerals as they did in FIG. 1.

The apparatus comprises a total of thirty chambers 10 in two concentric circular arrays of 15 chambers each. The chambers are supported at their entrance or left-hand ends by a plate 22 which has thirty openings 34 for snugly receiving the entrance ends of the chambers. A similar plate 26 having two circular arrays of openings 28 snugly receives and supports the exit ends of chambers 10. A cylindrical jacket 32 is connected between plates 22 and 26 and surrounds chambers 10. Liquid refrigerant is flowed into the jacket via an inlet 34 and the refrigerant exits through a conduit 36 so that the chambers 10 are continually bathed in coolant maintained at a temperature of, say, −10° F.

A long shaft 42 is journaled at the centers of plates 22 and 26. The shaft extends the entire length of jacket 32 and is isolated from the refrigerant flowing therethrough by a concentric jacket inner wall 32a. A spur gear 44 connected to the left-hand end of shaft 42 is rotated counterclockwise by a suitable chain drive (not shown).

Mounted on the right-hand end of shaft 42 beyond plate 26 is an arm 46 which rotates with the shaft. Arm 46 carries a knife blade 18 which is oriented so that its cutting edge 18a moves toward the viewer in FIG. 2 (clockwise in FIG. 3) as the shaft is rotated. Where the knife 18 moves, its edge 18a slides along an array of generally L-shaped knife backup plates 48 which are distributed around the outside surface of plate 26 as best seen in FIG. 3. The backup plates 48 are secured to plate 26 such that each one has its short arm 48a positioned adjacent the end of a chamber 10 in the outer array and its longer leg 48b positioned adjacent a chamber 10 in the inner array. The backup plates support the ends of the adhesive sticks and facilitate severing them.

Also mounted for rotation on shaft 42 beyond arm 46 is a second arm 52 that supports stop plate 12. As best seen in FIG. 3, the leading edge 12a of stop plate 12 immediately follows knife 18 as the knife is rotated clockwise in that figure. The stop plate is generally triangular in shape and occupies a sector of about 60° so that, at any given time, it is positioned opposite the exit ends of four chambers 10 in each of the inner and outer chamber arrays.

Figure 2:
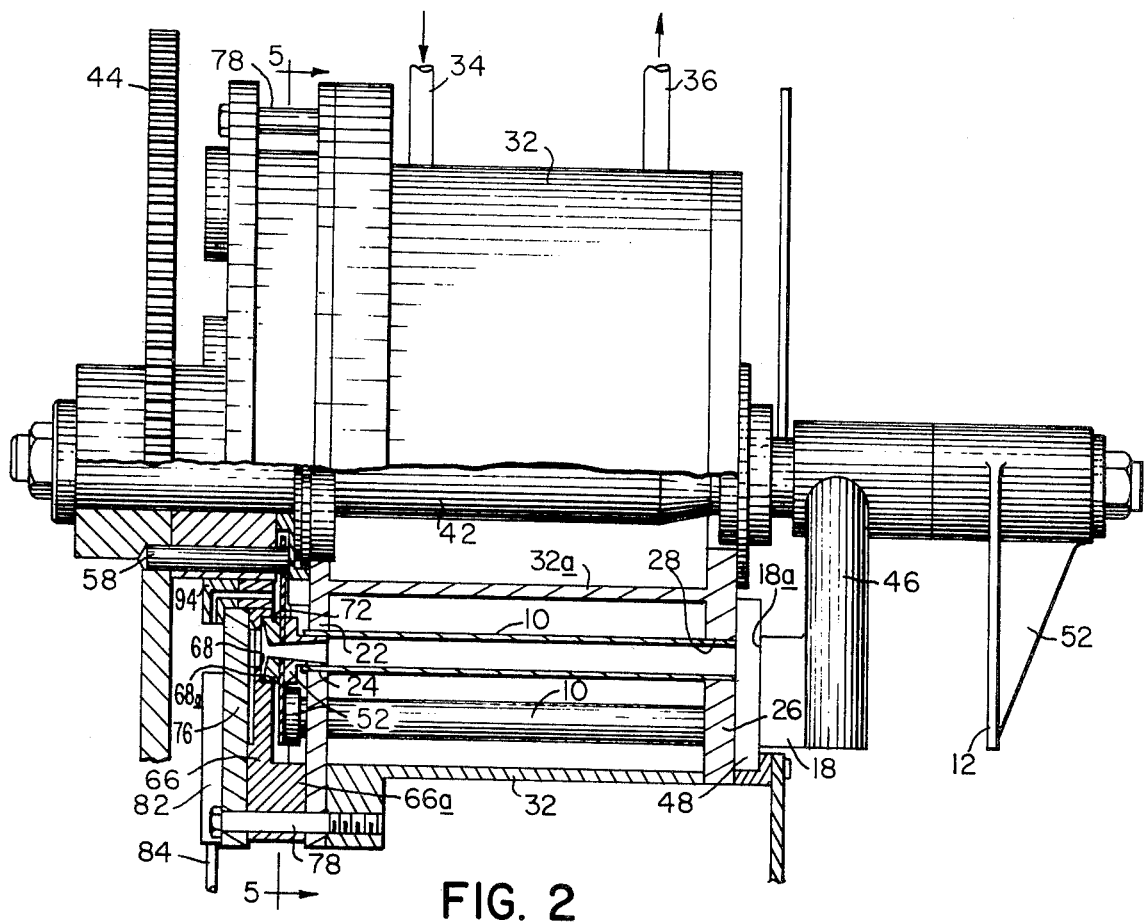
FIG. 2 is an elevational view with parts in section showing apparatus for making adhesive sticks in accordance with this invention.
Figure 3:
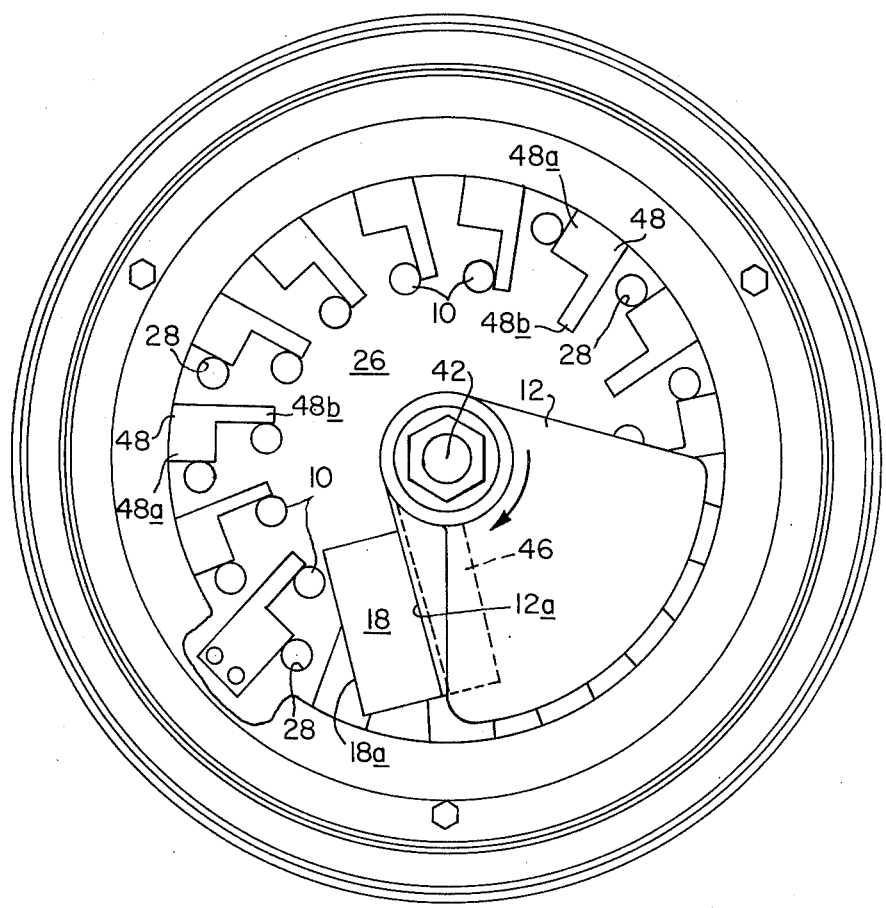
FIG. 3 is a view thereof in front elevation.
Figure 4:
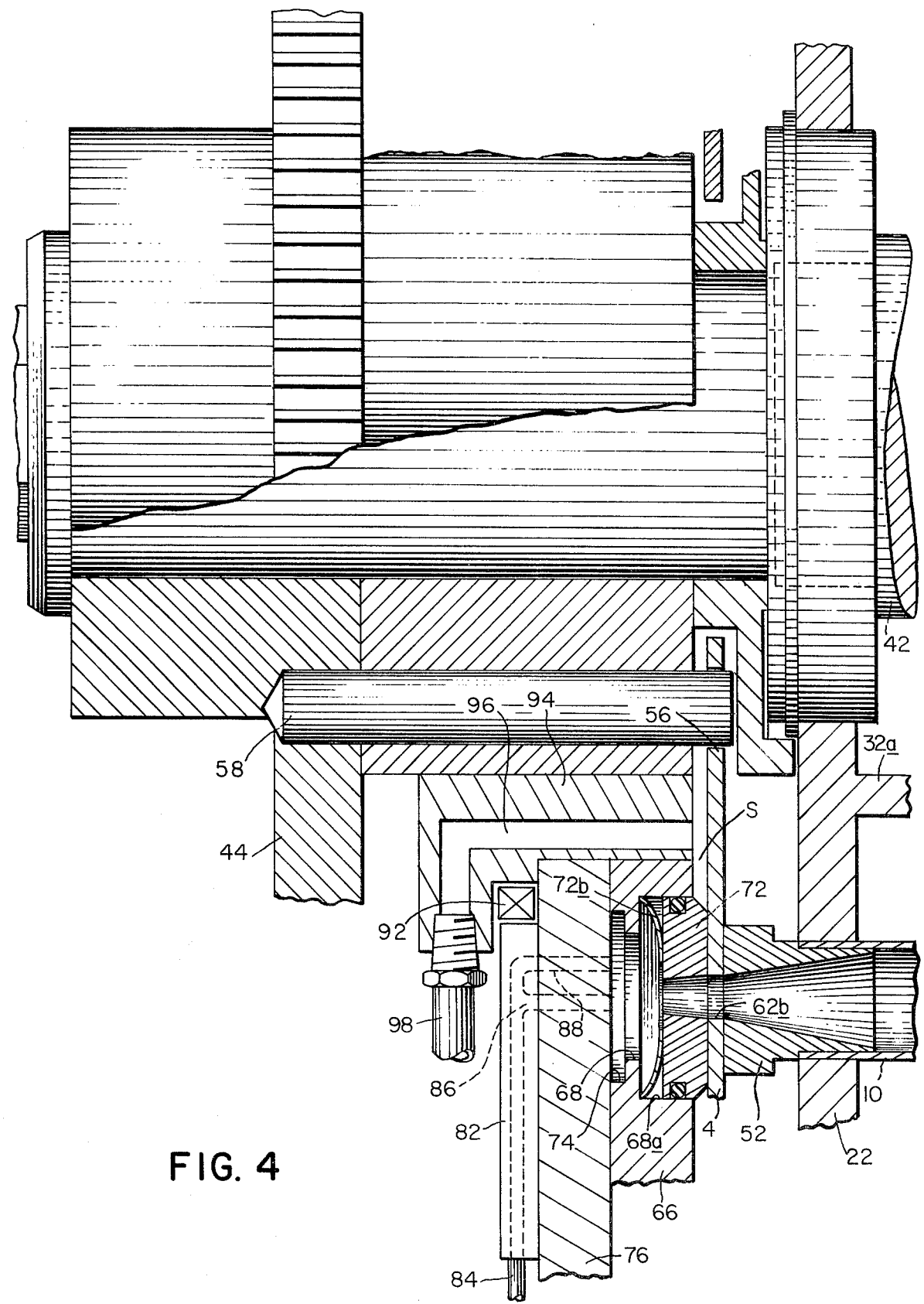
FIG. 4 is a view similar to FIG. 2 on a larger scale showing a portion of the FIG. 2 apparatus in greater detail.
Figure 5:
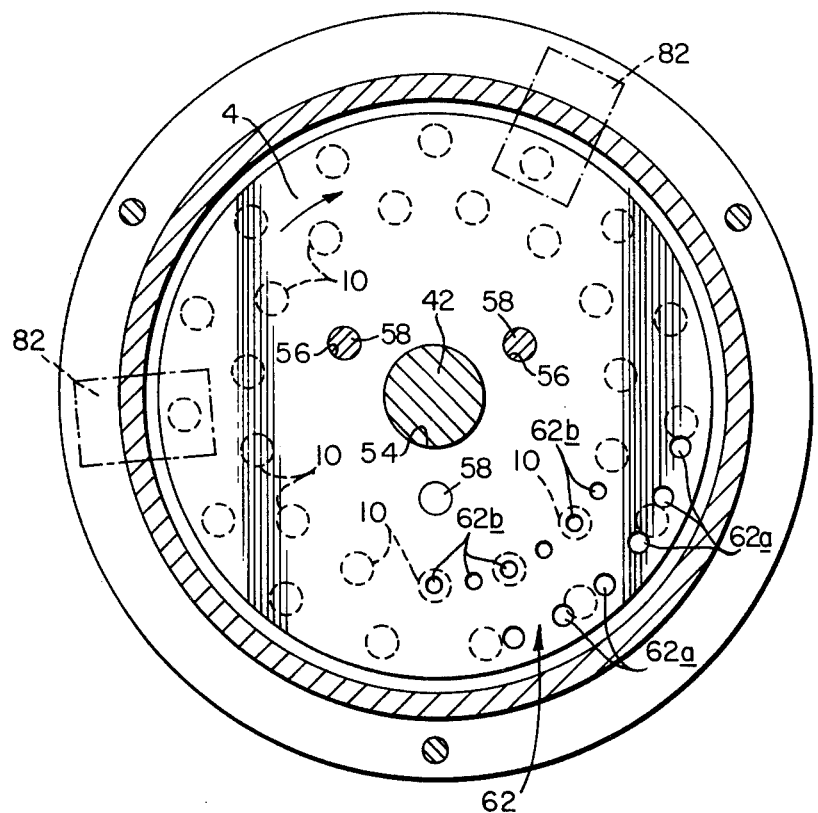
FIG. 5 is a sectional view along line 5—5 of FIG. 2.

Turning now to FIGS. 2, 4 and 5, the entrance end of each chamber 10 is fitted with a bushing 52 made of a suitable impact-resistant plastic. Positioned directly in front of these bushings is the gate valve 4. In this case, the gate valve is in the form of a disk having a central opening 54 for loosely receiving shaft 42. Distributed around opening 54 are three smaller openings 56 which slidably receive pins 58 keyed to the hub of gear 44. Thus, the valve plate 4 is constrained by the pins 58 to rotate the gear 44. However, the plate is free to flex and shift axially somewhat on the pins toward and away from bushings 52.

One quadrant of valve plate 4 is formed with inner and outer arrays of ports 62. There are six ports 62a in the outer array and six smaller ports 62b in the inner array. Furthermore, the inner and outer arrays of ports are on the same radii as the inner and outer arrays of chambers 10. Also the angular spacing between adjacent ports 62a is one-half the angular spacing between chambers 10 in the outer array so that, at any given time, a maximum of three ports are aligned with chambers 10 in the outer array. Similarly, the angular spacing between ports 62b is essentially one-half that of the cylinders 10 in the inner array so that a maximum of three of those ports are aligned with cylinders 10 at any time. Furthermore, the two port arrays are staggered so that when ports in the outer array are aligned with cylinders 10, the ports in the inner array are not, and vice-versa.

As best seen in FIGS. 2 and 4, an annular plate 66 is positioned just to the left of valve plate 4. A circumferential flange 66a butts against end plate 22 to properly locate plate 66 with respect to plate 4. Plate 66 has inner and outer arrays of openings 68 in register with the entrance ends of chambers 10. Furthermore, the ends of opening 68 facing the chambers are countersunk at 68a to accommodate inner and outer arrays of pressure-applying annular gaskets or pistons 72. This piston is also made of a suitable impact-resistant material and each includes a spring washer 72b which seats against the shoulder formed by the countersunk opening 66a so that it tends to urge the piston toward its corresponding chamber 10. Thus, since the valve plate 4 is free to move axially on pins 58, each piston 72 presses against the plate and urges it tightly against the opposing bushing 52 so that minimum leakage of adhesive occurs at the entrance ends of chambers 10.

An annular groove 74 is formed in the outer surface of plate 66 which intersects all of the openings 68 in that plate for reasons that will be apparent presently. Finally, another annular plate 76 is positioned over plate 62 and clamped to plate 22 by means of bolts 78 distributed around the circumference of plate 76 and extending through plate 66 as best seen in FIG. 2. When plate 76 is clamped in place, each gasket 72 is pressed tightly against valve plate 4 which is, in turn, pressed against bushings 52.

A set of three manifolds 82 are mounted 120° apart on the outer surface of plate 76. Two of these manifolds are shown in phantom in FIG. 2 and one is shown in detail in FIG. 4. Liquid resin is pumped by any suitable means to the manifold via a conduit 84. Passages 86 in the manifold conduct the adhesive to registering passages 88 through plate 76 leading to the annular groove 74 in plate 66. Thus, the annular groove 74 is constantly filled with adhesive from three locations and this adhesive flows into openings 68 through pistons 72 until it is stopped by the valve plate 4, except where one of the valve ports 62a or 62b is in register with the opening in piston 72. In that event, the liquid resin continues to flow into one of the chambers 10.

Suitable heaters are provided adjacent the manifold and the plates 66 and 76 to maintain the resin in a liquid state until it enters chambers 10. One of these electric heaters is illustrated at 92 in FIG. 4.

To prevent any accummulation of adhesive residue adjacent the valve plate 4, an annular block 94 is provided radially inward of plate 66. A passage 96 through block 94 conducts any such residue from the space S between valve plate 4 and plate 66 to a discharge conduit 98. This feature also helps to insure that the valve plate 4 functions properly as a gate valve for each chamber 10 with minimal leakage of adhesive as it opens and closes the entrance ends of successive chambers.

Referring to FIGS. 1, 3 and 5, the valve plate 4, stop plate 12 and knife 18 in the FIGS. 2 to 5 embodiment of the invention are oriented on shaft 42 so that the sequence of steps described in connection with FIG. 1 are carried out with respect to each chamber 10 as the shaft 42 rotates. FIG. 1 indicates the part of each revolution of shaft 42 that is devoted to the various steps in the process.

Assume that the shaft is rotating clockwise as viewed in FIG. 5 and that the valve plate 4 is oriented so that its ports are approaching the chambers 10 in the first quadrant of that figure. As soon as the first port 62a rotates into register with the first outer chamber 10, that chamber will receive a slug of resin. Since the plate is rotating continuously, the charge will continue until that first port 62a is no longer in register with the entrance end of that chamber.

After a small time interval, the second port 62a will be brought into register with that same chamber 10 so that a second slug of adhesive is injected into that chamber. Similarly when the third port 62a draws opposite that same chamber, a third slug will be injected. At the same time, the first port 62a will have rotated so as to be in register with the third chamber 10 in the outer array so that the same charging operation proceeds at that chamber. This same process continues as the ports 62b in the inner array are rotated into register with the entrance ends of the inner chambers 10. Thus, the inner and outer arrays of chambers in the first quadrant of FIG. 5 alternately receive successive injections of resin as the ports 62a and 62b rotate toward the second quadrant in FIG. 5.

Each chamber 10 in the first quadrant receives a total of six resin injections during each cycle of the system. This is sufficient to fill half the chamber. It should be noted that the inner ports 62b in valve plate 4 spend more time opposite the inner chambers 10, than the outer ports 62a spend opposite the outer chambers because they are further toward the center of the plate. Therefore the ports 62b are somewhat smaller than ports 62a so that each chamber 10 will receive approximately the same amount of resin during each cycle.

Thus, during each revolution of shaft 42, approximately 90° are devoted to injecting resin into any given chamber 10 in accordance with step 1 of the process.

As resin is injected into each chamber in the first quadrant, a previous adhesive charge in that chamber is ejected from the exit end of the chamber until it encounters stop plate 12. Thus, the stop plate is positioned on shaft 42 approximately opposite the quadrant of valve plate 4 containing ports 62a and 62b.

The new resin charge stays in the same position during substantially the remainder of the revolution of shaft 42 until the knife 18 is rotated opposite the exit end of that chamber. Thus, this cooling period proceeds as the shaft rotates from approximately 90° to 355°. At that point, the knife severs the adhesive sticks protruding from the chambers 10 in the first quadrant and the cycle is repeated for those chambers.

The apparatus illustrated in FIGS. 2 to 5 carries out the steps of applicant's process on a succession of chambers continuously. Accordingly, the apparatus has a relatively high output. Yet, it can operate unattended for long periods of time until its supply of liquid resin is depleted.

It will be seen from the foregoing, then, that the objects set forth above, among those made apparent by the preceding description are efficiently attained and, since certain changes may be made in carrying out the above steps or in the constructions set forth, it is intended that all matter contained in the above description or shown in the accompanying drawings be interpreted as illustrative and not in a limiting sense.

It is also to be understood that the following claims are intended to cover all of the generic and specific features of the invention herein described.

I claim:
1. The method of making hot melt adhesive sticks comprising the steps of
   A. intermittently injecting a charge of liquid adhesive into one end of a cooling chamber under sufficient pressure to eject a portion of a solidified shape resulting from the cooling of a previous adhesive charge, from the opposite end of the chamber,
   B. preventing complete ejection of the solidified shape from the chamber thereby limiting the size of the liquid charge into the chamber and preventing leakage of liquid adhesive from said opposite end of the chamber,
   C. severing the portion of the shape protruding from said opposite end of the chamber from its trailing end which plugs said opposite end of the chamber, and wherein said process comprises the additional steps of
     maintaining the injecting charge under pressure until its outside wall forms and sets so that any resin shrinkage that occurs takes place at the trailing end of the charge where it can be made up by a succeeding resin charge into the chamber, and
     interrupting the injection of liquid adhesive into the chamber after the solidified shape is partially ejected from the chamber.
2. The method of making hot melt adhesive sticks comprising the steps of
   A. injecting a charge of liquid adhesive into one end of a cooling chamber under sufficient pressure to eject a solidified stick resulting from a previous charge of adhesive from the opposite end of the chamber, and
   B. maintaining the injecting charge under pressure until its outside wall forms and sets so that said wall has a uniform cross section along its entire length and so that any adhesive shrinkage is confined to the end of said charge where it can be made up by a succeeding charge into the chamber.
3. The method defined in claim 2 including the additional step of
   A. limiting the extent to which the solidified stick can eject from the chamber, and
   B. severing the portion of the solidified stick which protrudes from said opposite end of the chamber.
4. The method defined in claim 3 including the additional step of cooling the chamber following injection of adhesive into the chamber and prior to severing the protruding portion of the solidified stick so that the charge of adhesive therein solidifies.
5. A process as defined in claim 1 wherein said ejecting action is effectively opposed by the resistance of an insufficiently cooled stick to movement along said chamber, such opposition forming means for achieving a delay in said injecting step, when said portion to be rejected is insufficiently cooled.

* * * * *

UNITED STATES PATENT OFFICE
CERTIFICATE OF CORRECTION

Patent No. 4,028,458　　　　　　　　　Dated June 7, 1977

Inventor(s)　Ray H. Wallace

It is certified that error appears in the above-identified patent and that said Letters Patent are hereby corrected as shown below:

Column 5, line 41, "Super STa" should read -- Super Sta --.

Column 5, line 43, "Castorwax $^3$" should read -- Castorwax $^e$ --.

*Signed and Sealed this*

*First* Day of *November 1977*

[SEAL]

*Attest:*

RUTH C. MASON　　　　　　　　　LUTRELLE F. PARKER
*Attesting Officer*　　　　　　　*Acting Commissioner of Patents and Trademarks*